US008281302B2

(12) United States Patent
Durazzo et al.

(10) Patent No.: US 8,281,302 B2
(45) Date of Patent: Oct. 2, 2012

(54) METHOD AND APPARATUS FOR DYNAMICALLY INSTANTIATING SERVICES USING A SERVICE INSERTION ARCHITECTURE

(75) Inventors: Kenneth Durazzo, San Ramon, CA (US); Paul Quinn, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1072 days.

(21) Appl. No.: 12/229,623

(22) Filed: Aug. 26, 2008

(65) Prior Publication Data
US 2010/0058329 A1   Mar. 4, 2010

(51) Int. Cl.
*G06F 9/445* (2006.01)
(52) U.S. Cl. ......... 717/176; 717/172; 709/220; 709/229
(58) Field of Classification Search .......... 717/168–178; 709/220–231
See application file for complete search history.

(56) References Cited

U.S. PATENT DOCUMENTS

| 6,715,143 | B1 | 3/2004 | Chantrain et al. | |
| 2002/0178254 | A1 | 11/2002 | Brittenham et al. | |
| 2003/0135596 | A1 | 7/2003 | Moyer et al. | |
| 2003/0191824 | A1* | 10/2003 | Rao et al. | 709/220 |
| 2004/0148184 | A1* | 7/2004 | Sadiq | 705/1 |
| 2006/0064481 | A1* | 3/2006 | Baron et al. | 709/224 |
| 2007/0237147 | A1 | 10/2007 | Quinn et al. | |
| 2008/0127168 | A1 | 5/2008 | Tremblay et al. | |
| 2008/0177896 | A1 | 7/2008 | Quinn et al. | |
| 2008/0209016 | A1 | 8/2008 | Karve et al. | |

FOREIGN PATENT DOCUMENTS
WO   2008088954 A2   7/2008

OTHER PUBLICATIONS

Duvos et al., An Infrastructure for the Dynamic Distribution of Web Applications and Services, Dec. 2000, Department of Computer Science Boston University, pp. 22.*
Shenoy, G.; Satapati, S.K.; Bettati, R.; , "HydraNet-FT: network support for dependable services," Distributed Computing Systems, 2000. Proceedings. 20th International Conference on , vol., no., pp. 699-706, 2000.*
Verheecke et al., AOP for Dynamic Configuration and Management of Web Services, ICWS-Europe 2003, LNCS 2853, pp. 137-151, 2003, Springer-Verlag Berlin Heidelberg 2003.*
Examination Report in corresponding European Application No. 09 791 646.4, mailed Sep. 23, 2011.
U.S. Appl. No. 11/655,363, filed Jan. 19, 2007.
U.S. Appl. No. 11/400,695, filed Apr. 7, 2006.
International Search Report and Written Opinion dated Mar. 15, 2010; cited in PCT/US2009/054256.

* cited by examiner

*Primary Examiner* — Wei Zhen
*Assistant Examiner* — Satish Rampuria

(57) ABSTRACT

A generic service node that operates in a first state while waiting for instructions to adopt a specific service. Upon receiving the instructions, the generic service node operates in a second state where the node installs software received from a network to enable the generic service node to provide the specific service to the network. The generic service node is in communication with a control node or nodes such that the generic service node can be adapted to provide a particular service as requested by the control node(s).

21 Claims, 5 Drawing Sheets

METHOD AND APPARATUS FOR DYNAMICALLY INSTANTIATING SERVICES USING A SERVICE INSERTION ARCHITECTURE

BACKGROUND OF THE INVENTION

1. Field of the Invention

The present disclosure generally relates to computer networks. More specifically, the present disclosure relates to a service insertion architecture for computer networks.

2. Description of the Related Art

A computer network is comprised of a plurality of hardware elements that provides services for computer network users. Such services include domain name services, firewalls, network packet filtering, network packet capture, network packet caching, network packet routing and the like. Current methods of deploying and provisioning services require substantial planning and engineering as well as a "human touch" to enable each service. This makes network administrators very cautious and potentially reticent to deploy new services, as the expenses and risks associated with these activities, are often greater than the perceived benefit of the additional service to their network.

For example, adding a new service "X" into an already deployed network may entail the following process. The administrator is required to understand the performance and scalability attributes of the service in relation to their network capacity in order to procure the correct hardware platform (also referred to herein as a network device) for supporting this service.

In order to deploy service "X", the customer must engineer and qualify a redirection mechanism (e.g., WCCP, PBR, and the like) and/or modify the network forwarding topology for that platform to enable traffic to flow to the platform from the network in order for the device to perform its service.

In order to allow for redundancy, increased capacity or scalability, the administrator must deploy another ("N" numbers of) platform. This requires administrators to either provision an active or standby platform, which may or may not operate anywhere near its optimal capacity. Alternatively, the service platforms may be deployed as distinct entities, which increases further the operational complexities of deployment, troubleshooting, and management of the network.

If an administrator wants to have a spare of the platform, they need to purchase the exact platform they want to spare. For example, this effectively means that they need to buy and store a firewall, IPS (Intrusion Prevention Service), Server Load Balancer (SLB), and the like and store the platform for eventual deployment in the event of a primary device failure. This also requires that, in the event of platform failure, a "truck roll" needs to be completed so the platform can be delivered, cabled and provisioned. This also implies that the amount of hardware the customer has to have on hand to cover all of their specific needs for any resiliency is very high. The cost and complexity of supplying each service also precludes administrators from deploying any service that is not deemed absolutely critical to business operations.

If an administrator determines that additional service capacity is needed, the foregoing procedure for deploying service "x" must be reproduced for each new service instance added to the network.

Therefore there is a need in the art for a method and apparatus that provides a service insertion architecture that supports dynamic adaptability.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Overview

One embodiment of the present invention comprises a generic service node that operates in a first state while waiting for instructions to adopt a specific service. Upon receiving the instructions, the generic service node operates in a second state where the node installs software to enable the generic service node to provide the specific service to the network. The generic service node is in communication with a control node or nodes such that the generic service node can be adapted to provide a particular service as requested by the control node(s).

Description

Figure 1:
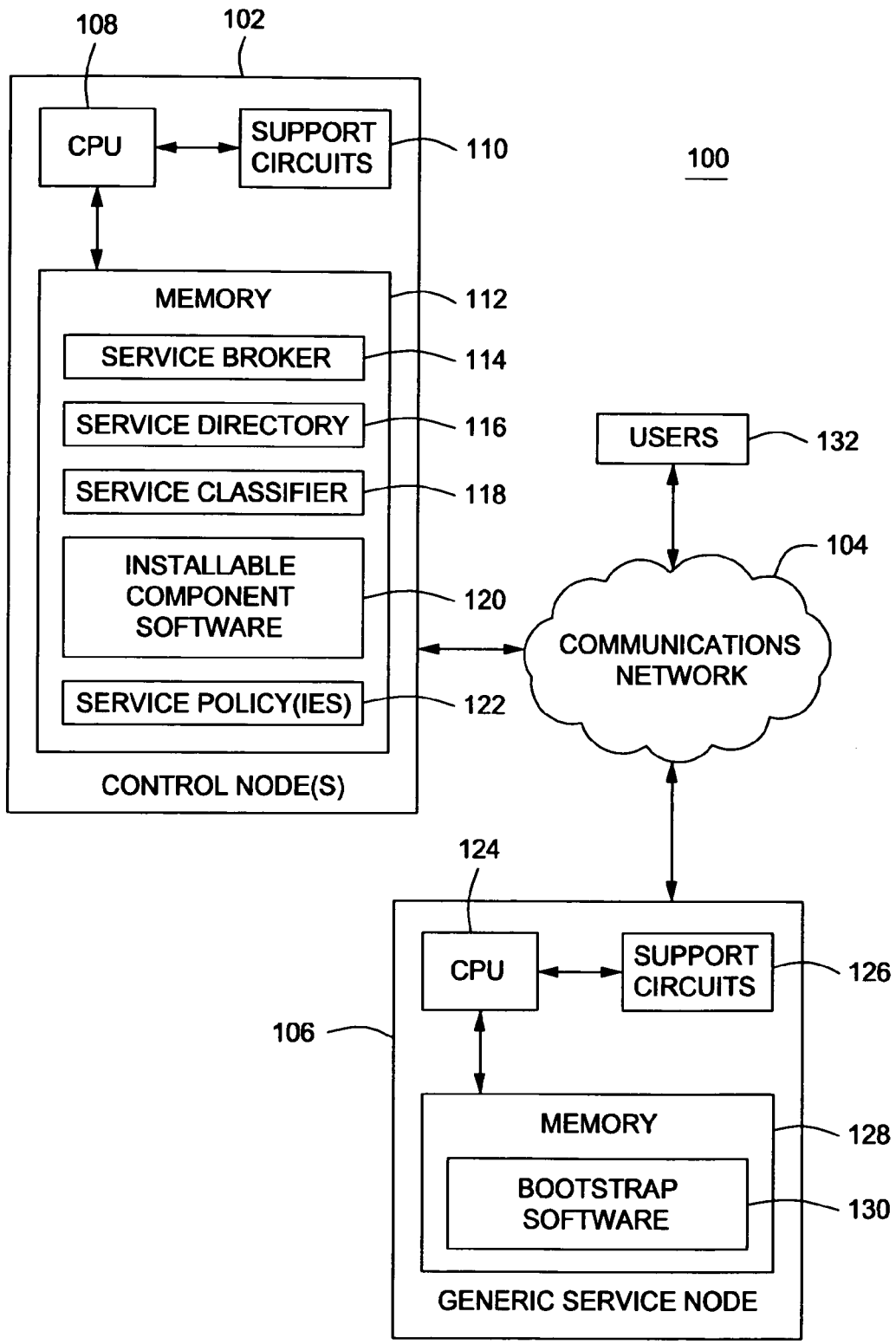
FIG. 1 depicts a block diagram of a hardware architecture that is used in accordance with one embodiment of the invention.

FIG. 1 depicts a block diagram of a computer network 100, or a portion thereof, that includes one embodiment of the present invention. The computer network 100 comprises at least one control node 102, a communications network 104, and a generic service node 106. The combination of the control node(s) 102 and the generic service node 106 provides services to users 132 in an adaptive manner.

The control node 102 comprises a central processing unit 108, support circuits 110, and a memory 112. The CPU 108 may be one or more commercially available processors or microprocessors. The support circuits 110 comprise well-known circuits, modules, and subsystems that support the operation of the CPU 108. The support circuits 110 comprise such elements as cache, network interface cards, dock circuits, power supplies, bus controllers, and the like. The memory 112 may comprise one or more random access memories or read-only memories. Such memories include semiconductor memory, disk drives, optical memory, and the like.

The control node 102 stores various software packages or modules within memory 112 that are executed by the CPU 108 to facilitate certain services to be provided to the network 100 and its users 132. These services can be provided by a single server or multiple servers. In a typical deployment, each service would be provided by an individual hardware node 102. For simplicity, the software that provides the various services to the network 100 is depicted as being stored in a single control node 102. Those skilled in the art will understand that these services and the software that supports these services may be distributed amongst a number of hardware nodes that will form specific-purpose services within the network 100. Specifically, memory 112 stores a service broker 114, service directory 116, service classifier 118, various installable component software 120, and at least one service policy 122. In other embodiments, the service broker 114, service directory 116 or service classifier 118 may be executed on different nodes. These software modules are executed to instantiate specific services to be available via the generic service node 106. The control node 102 communicates with the generic service node through a communications network 104.

Communications network 104 may comprise various communications infrastructure including an ethernet, a wireless network, wide-area network components, local-area network components, and the like.

The generic service node 106 comprises at least one central processing unit 124, support circuits 126, and memory 128. The generic service node is coupled to the communications network such that when provisioned by the control node(s) 102, the generic service node will provide specific services to the users 132 of the communications network 104.

At least one central processing unit 124 comprises one or more commercially available processors or microprocessors. The support circuits 126 comprise well-known circuits, modules, and subsystems that support the operation of the CPU 124. Such support circuits 126 comprise clock circuits, bus controllers, cache, power supplies, network interface cards and the like. The memory 128 comprises one or more memory types including random access memory, read-only memory, disk drives, optical drives, and the like. The generic service node 106, within its memory 128, stores bootstrap software 130 that enables the generic service node to be connected to the communications network 104 and initialize itself. The generic service node 106 once initialized, will not provide any services to the network until it is provisioned by one or more control nodes 102. In this manner, the services provided by a generic service node 106 may be inserted into the network 100 in a dynamic manner (as needed). The ability to insert such services in a dynamic manner facilitates a service insertion architecture (SIA) for the network 100. A description of a SIA is provided in U.S. patent application Ser. No. 11/655,363, filed Jan. 19, 2007, and incorporated by reference herein in its entirety.

Figure 2:
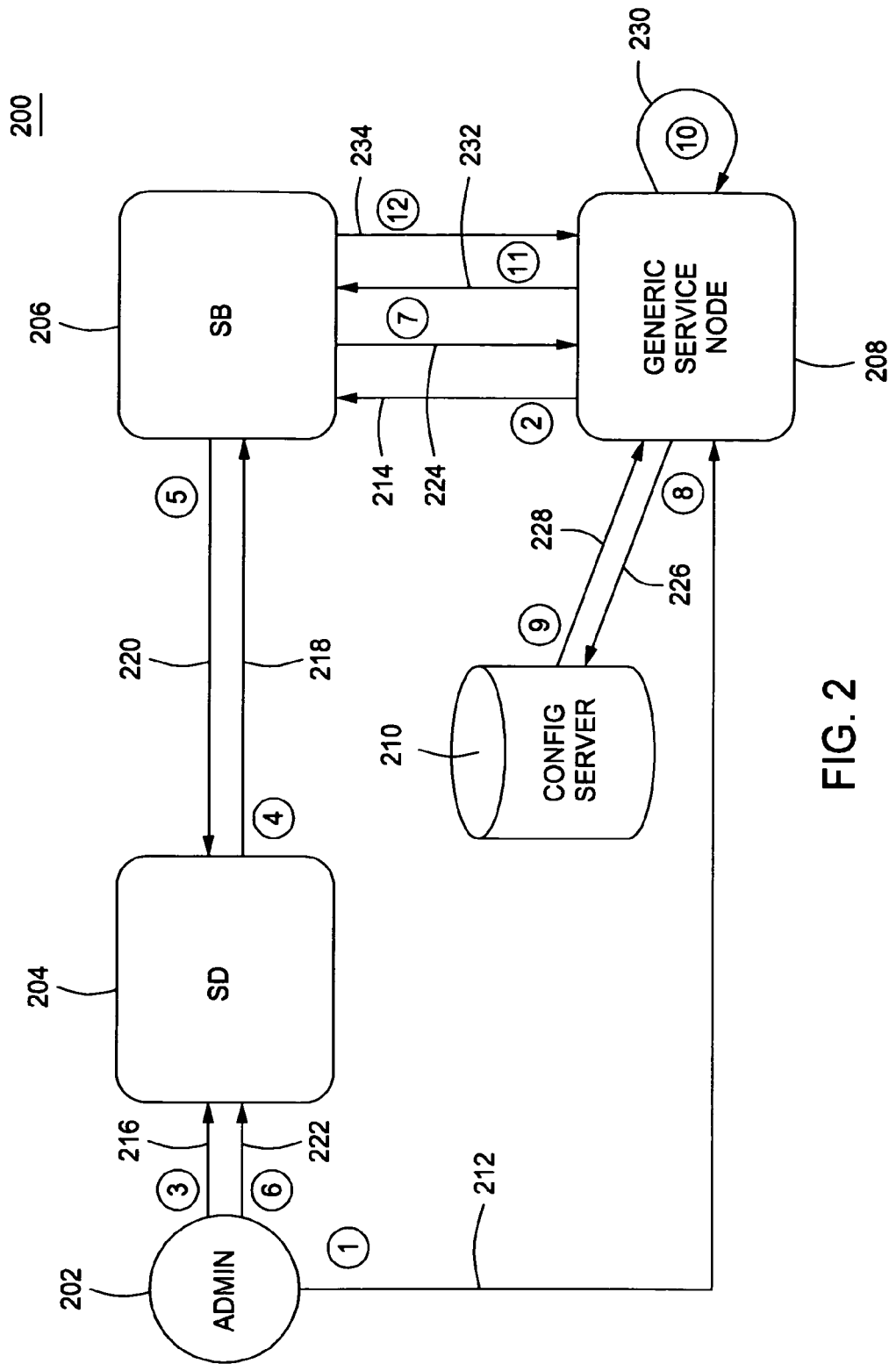
FIG. 2 depicts a functional block diagram of one embodiment of the present invention.
Figure 3:
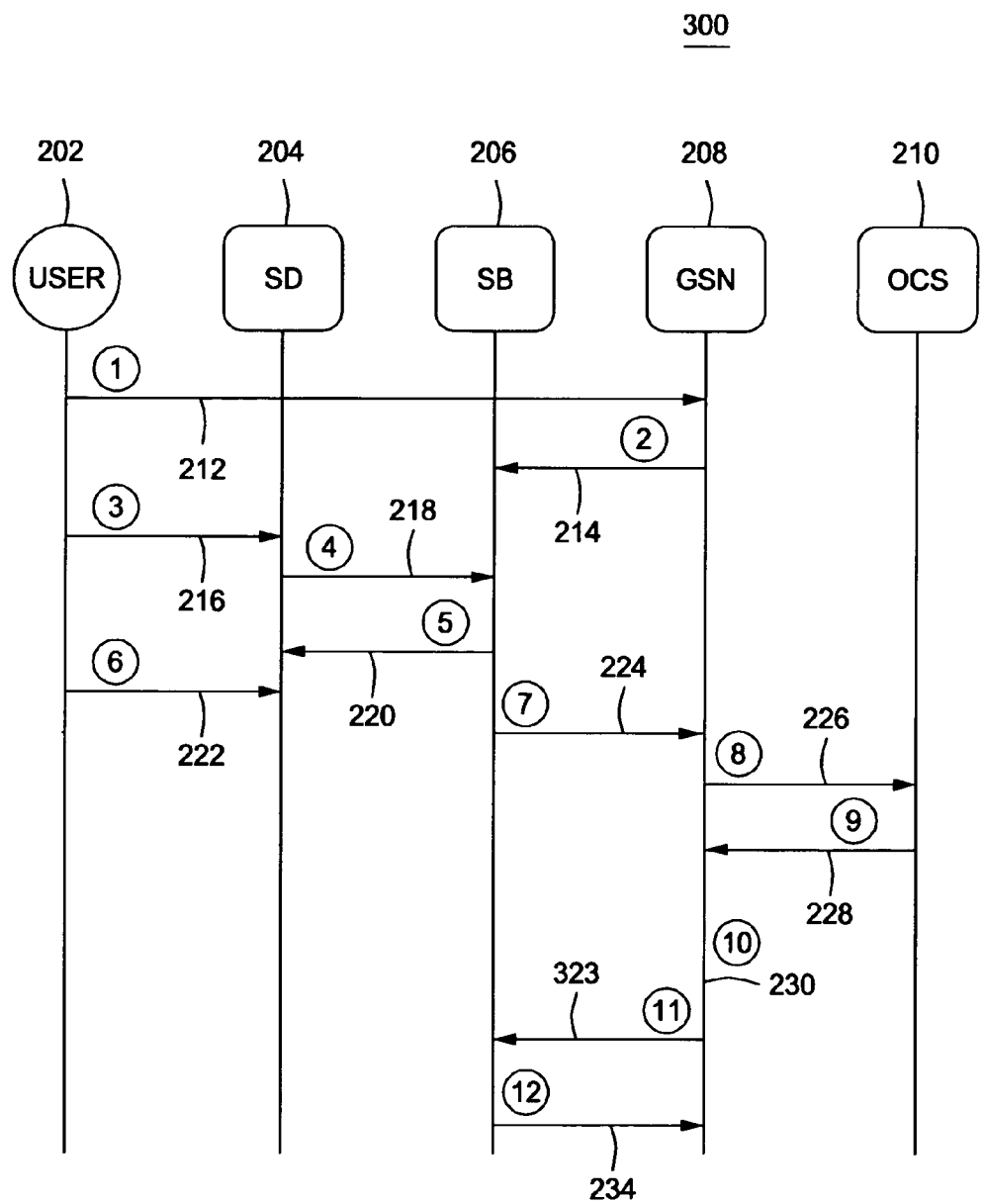
FIG. 3 depicts a flow diagram representing the operation of one embodiment of the invention depicted in FIG. 2.
Figure 4:
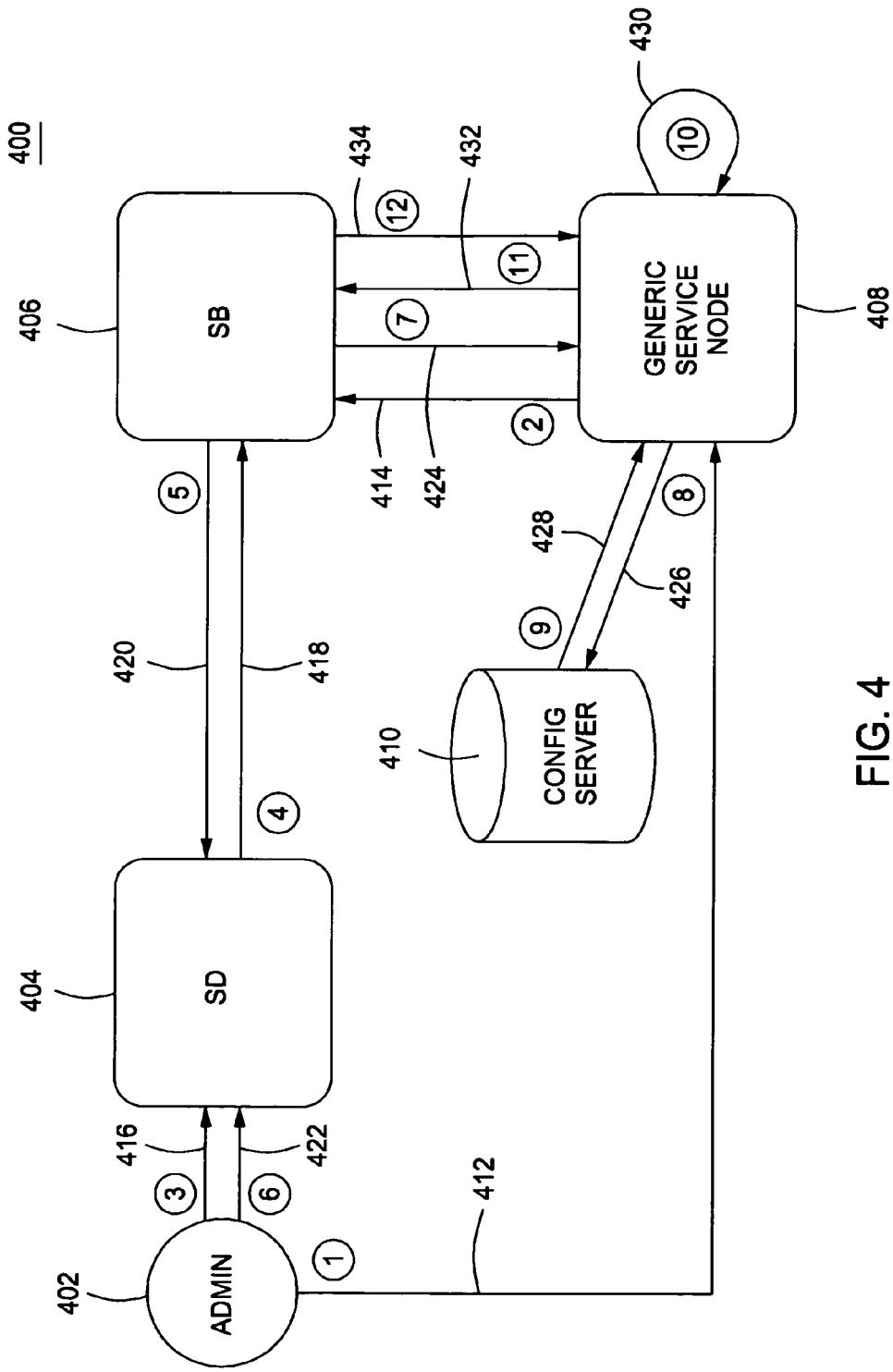
FIG. 4 depicts a functional block diagram of another embodiment of the present invention.
Figure 5:
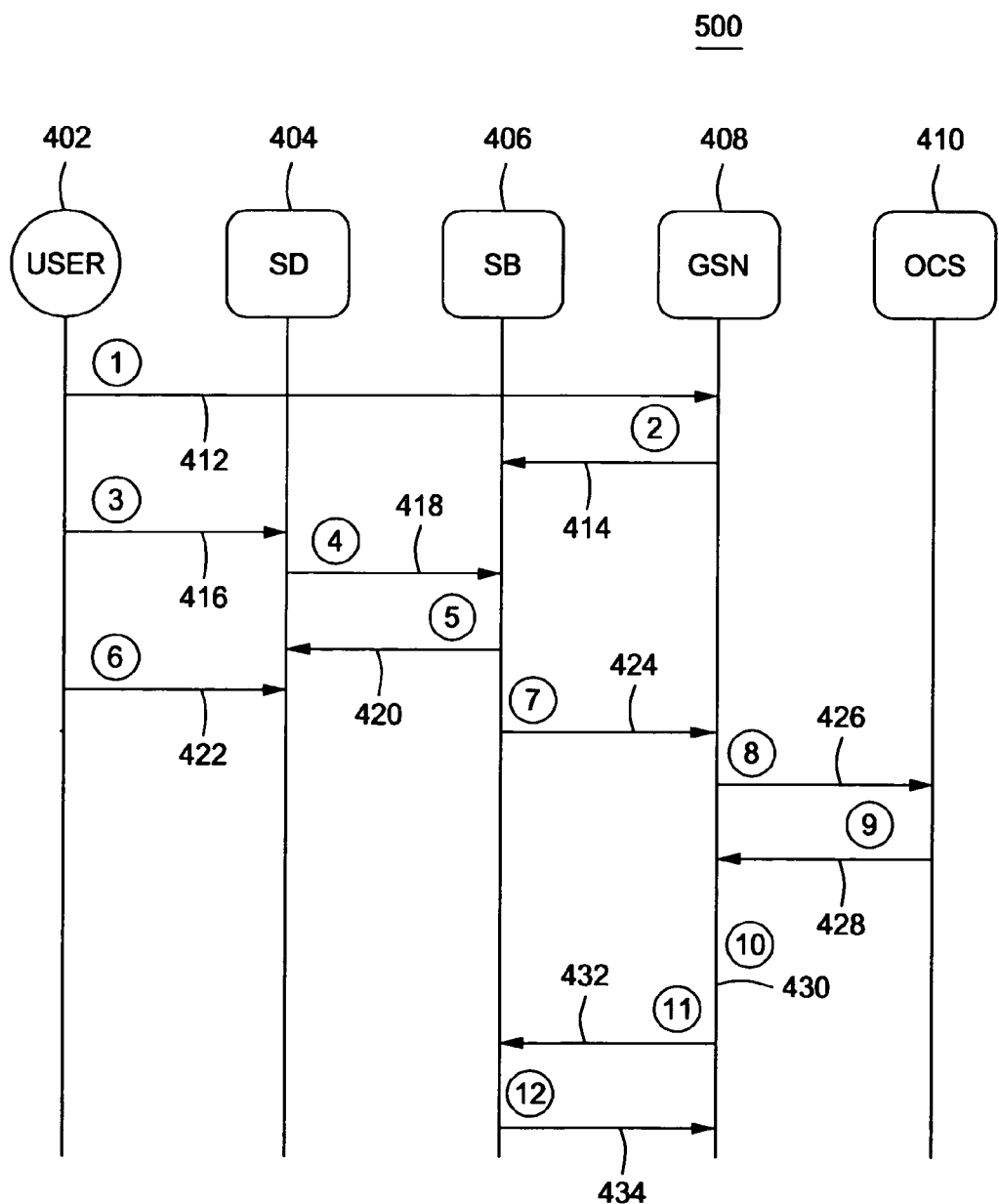
FIG. 5 depicts a flow diagram representing the operation of embodiment of the invention depicted in FIG. 4.

In one embodiment of the invention, provisioning of the generic service node is driven by an administrator generated policy. FIGS. 2 and 3 depict functional and flow diagrams representing this first embodiment. In a second embodiment, the generic service node is provisioned in an adaptive manner to support the immediate requirements of the network. FIGS. 4 and 5 depict functional and flow diagrams representing this second embodiment.

FIG. 2 depicts a functional diagram of the various software modules that operate to provision the generic service node 106 of FIG. 1. As mentioned above, these functional blocks may be executed upon one or more control nodes within the network. The functional architecture 200 of the network comprises a service broker 206, a service directory 204, an administrator 202, a configuration server 210 and a generic service node 208. The service broker 206 forms the main controller that permits service deployment, registration, and the like for an SIA service-aware network infrastructure. The generic service node 208 comprises embedded bootstrap software which allows the generic service node to participate in SIA yet not initially be provisioned with any service-specific software, allowing the administrator to deploy, as necessary, the specific software to fulfill the desired service goals.

The functional diagram of FIG. 2 represents a prescriptive way for an administrator 202 to purchase a generic service hardware node 208 and during network deployment time, choose how the generic hardware will be implemented from a service perspective, e.g., deploy the service node as a firewall, service load balancer (SLB), packet filter capture, and the like. This enables an administrator 202 to have "N" number of generic service nodes available to assume a service node identity as prescribed by the administrator when a service chain is created. In this embodiment, the administrator 202 has a priori knowledge of the number of specific services and their service node information.

The service directory 204 defines the chains of network services that are created as well as visualized by the administrator 202. The service broker 206, as mentioned previously, forms the main control server for the SIA by communicating with all of SIA participating platforms. The generic service node 208 is loaded with a program that, during a first state of operation, bootstraps the platform to participate within the SIA framework and register with an SIA control plane. Once registered, the generic service node waits in the first state until instructed to transition to a second state. In the second state of operation, the generic service node 208 can be programmed by the service broker 206 to enable the generic service node 208 to assume a service identity as defined by the administrator.

The configuration server 210 is a repository of software that is needed to enable the generic service node 208 to assume the appropriate service node identity and validate any licenses (as necessary) for the implementation. The generic service node 208 may be, for example, an X86-based blade server, an internal service module, a 1RU PC appliance, and the like. When the generic service node 208 is to adopt a particular service, the node 208 informs the configuration server 210 of the type of service the node 208 will adopt and the characteristics of the node, e.g., processor type, memory amount, bus speed and the like. The configuration server 210 responds with the appropriate software for installation upon that particular node to facilitate the requested service.

FIG. 3 depicts a flow diagram of the collaboration between the various functional blocks of FIG. 2 to initialize a generic service node 208 and define that node to perform a specific service. FIG. 2 and FIG. 3 are simultaneously described.

To begin the administrator driven process, at path 212, the administrator 202 installs a generic service node 208 on the network and configures SIA, i.e., the generic service node 208 is enabled to connect to a control plane of SIA. At path 214, the generic service node 208 completes SIA registration process by registering with the service broker 206. At path 216, the administrator 202 invokes the service directory user interface and process. Through this interface, the administrator establishes a chain of services that defines the service requirements of the network.

At path 218, the service directory 204 polls the service broker for current status of the services in the network. At path 220, the service broker sends service information to the service directory 204 e.g., what services are available.

At path 222, the administrator 202 creates a service policy defining a service chain, which includes the particular services to be deployed in the service chain. The administrator 202 selects the appropriate generic service node 208 to assume a particular service identity as defined in the policy. At path 224, based upon the service chain implemented by the administrator, the service broker 206 sends a message to the generic service node 208 to download and assume a specific service node identity, e.g., firewall, IPS, virtualization server, and the like.

At path 226, the generic service node 208 contacts the configuration server 210 to download the appropriate operating system (OS), software and configuration information (a configuration package) for the service node identity that is to be assumed. Such a download includes any installable software components and configuration information required to cause the node 208 to perform the desired service. The generic service node informs the configuration server of the node's characteristics, e.g., processor type and speed, memory amount, bus speed and the like, as well as the type of service to be adopted. The configuration server 210 ensures the characteristics can support the requested service. The server 210 also determines whether any licenses are needed for the software.

At path 228, the server 210 processes the request and delivers the requested configuration package to the generic service node 208. At path 230, the generic service node receives and installs the configuration package for the assumed service node identity. At path 232, the generic service node 208 may reinitialize, as necessary, to assume the new service node identify, and once in an appropriate operational state, registers with the service broker 206 as the service node having the assumed identity. Lastly, at path 234, the service broker 206 inserts the service node (previously generic service nod 208) into a service chain to meet the service chain characteristics set by the administrator 202.

In this manner, the administrator 202 has established a policy that requires a specific service to be implemented within the network. The service broker 206 utilizes that policy to initialize the generic service node 208 to be provisioned to provide the service as identified within the administrator's policy. Consequently, the foregoing functional process is an "administrator-driven" model for the SIA.

Although the various functions performed within the diagrams of FIG. 2 and FIG. 3 are discussed as being performed on a single server, they may be performed on multiple servers. In other embodiments, each of the services may be provided within a virtualized environment where the services are performed on a single server, with each function being performed within a separate virtualized server or "container". In this manner, all of the functions, including the generic service node, may be provided by a single hardware platform, and one or more functions may be executed using an independent virtual environment.

In a second embodiment, the generic service node 208 is dynamically provisioned and allocated. In this model, an event, condition or policy definition is used as a mechanism for service provisioning that causes the generic service node to transition from the first state to the second state. An event or threshold of services requirements within a service chain is defined and when reached, triggers a dynamic provisioning, configuration, and insertion of the required service or services into the service chain using the appropriate number of generic service nodes. In essence, the network creates a service-on-demand model. This model implies that the administrator sets a policy event on a service chain that when reached will act as a trigger to dynamically allocate a generic service node to assume the appropriate service node identity for the duration of the event. At which point, the generic service node may go back to its original generic service node state (i.e., the first state) or continue in the assumed service node identity role as necessary to meet the policy characteristics.

FIG. 4 depicts a functional block diagram of a dynamic allocation driven model of the SIA. FIG. 5 depicts a flow diagram for the communications between the functional blocks of FIG. 4. FIGS. 4 and 5 shall be described together. At path 412, the administrator 402 installs the generic service node 408 on the network and configures SIA, as necessary. At path 414, the generic service node 408 completes SIA registration process by registering with the service broker 406. At path 416, the administrator 402 invokes the service directory 404 and its user interface. Through this interface the administrator 402 develops a policy for adaptive allocation of the generic service node 408. The policy establishes both the overall service chain as well as the criteria for allocating the generic service node to the service chain.

At path 418, the service directory 404 polls the service broker 406 for a current status of the network nodes. At path 420, the service broker 404 sends the service information to the service directory 404.

At path 422, the administrator 402 creates a service policy defining a service chain as well as a criteria upon which the service broker 406 should insert another service node into the service chain. In one embodiment, the criteria is a threshold associated with an active node in the service chain. The threshold defines a level of service that, when exceeded, causes a generic service node to be provisioned in the same manner as the node with the exceeded threshold. In this manner, assistance is brought "on-line" in an on-demand manner. At path 424, when the threshold is reached, the service broker 406 sends a message to the generic service node 408 to download and assume a specific service node identity.

At path 426, the generic service node 408 then contacts the configuration server 410 to download the appropriate operating system, software and configuration information (a configuration package) that are necessary for the assumed service node identity. At path 428, the configuration server 410 receives the request and delivers the requested configuration package to the generic service node 408. At path 430, the generic service node 408 receives and installs the configuration package for the assumed service node identity. At path 432, the generic service node 408 reinitializes, as necessary, to assume the new service node identity, and once in an operational state, registers with the service as an active service node for the assumed identity. Lastly, at path 434, the service broker 406 may then insert the service node into a service chain, as necessary, to meet the policy set by the administrator.

In this manner, the generic service node 408 is dynamically allocated to fulfill a need, upon request, to support the network operation. When that need is fulfilled, the generic service node 408 may remain in the adopted service identity or the generic service node 408 may be returned to a generic state to await its next service requirement.

In one embodiment, the generic service node 408 may be coupled to the network as a spare node. This spare node may be configured, upon demand, to adopt a service that has failed. Consequently, a single generic service node 408 may be used to spare a plurality of services that are available to network users.

An example of a specific use of the administrator driven model wherein the administrator has implemented SIA including service brokers, service nodes, and generic service nodes. As disclosed above, in the administrator driven embodiment the administrator creates a policy for a chain of services where, in one embodiment, that chain is represented as:

SCL1→IPS→Firewall→Web-Cache→Null (end of chain)

The administrator then selects the appropriate entity to enact the policy, in this case, the administrator selects:

*SCL*1=Router1/*INT E*0/0

*IPS=IPS/SJ–fl*2

Firewall=Firewall2/*SJ–fl*2

Web-Cache=*GSN*1/*SJ–fl*2

The associated entities above are added to the definition of the service chain and are given the appropriate SIA information via the SIA control plane. The GSN1 contacts the configuration server and downloads the appropriate configuration package in order to assume the identity of the Web-Cache service node. Once initialized as a new Web-Cache service node, the previous generic service node registers with the service broker as the Web-Cache service node. Once registered, the SIA service broker assigns the node to the appropriate service chain. The SIA service chain is then fully operable and services would start to process traffic associated with that chain.

In the dynamic allocation model, the administrator has implemented SIA including service brokers, service nodes, and generic service nodes. The generic service node contains bootstrap software that enables the node to register with the SIA service broker as a generic node, available to assume any required service identity. In an illustrative embodiment, the administrator creates a policy for a chain of services that is represented as follows.

SCL1→IPS→Firewall (50% load threshold, then add another firewall into the network)→null (end of chain)

The administrator then selects the appropriate entity to enact the policy. In this case, the administrator selects:

$SLC1$=Router1/$INT\ E0/0$ $IPS\ (SN1)$=$IPS/SJ\text{-}fl2$

Firewall ($SN2a$) (50% load threshold)=Firewall2/$SJ\text{-}fl2$

Firewall ($SN2b$)=$GSN1/SJ\text{-}fl2$

The associated entities above are added to the service chain and are given the appropriate SIA information via the control plane. If the load threshold on the firewall service becomes greater than 50%, a critical threshold is reached causing the GSN1 to automatically (with no user intervention) contact the configuration server and download the appropriate configuration package in order to assume the identity of the firewall SN2b service node. Once initialized as a new firewall, the generic service node automatically registers as a firewall service node and is assigned to the appropriate service chain via SIA service broker and control plane processes. The SIA service chain is then fully operable and services would start to process traffic associated with that chain. If the load threshold on the SN2a was to retreat below 50%, the policy could dictate that the generic service node deregister with the service node 2b firewall node and reboot into a clean generic state (or return to a previous service state). Alternatively, the generic node could remain a firewall node even when the load threshold is not exceeded.

While the foregoing is directed to embodiments of the present invention, other and further embodiments of the invention may be devised without departing from the basic scope thereof, and the scope thereof is determined by the claims that follow.

What is claimed is:

1. An apparatus for providing services to a network having a service insertion architecture (SIA) comprising:
   a generic service node coupled to the network and comprising previously loaded bootstrap software, wherein the generic service node is configured to, upon initialization thereof, execute the bootstrap software so as to automatically register with a control plane of the SIA such that the generic service node is configured to participate in the SIA without an initially assigned service, wherein the bootstrap software further causes the generic service node to operate in a first state in which the generic service node waits for instructions to adopt a specific service and, upon receiving instructions to adopt a specific service, the bootstrap software causes the generic service node to operate in a second state to install software to enable the generic service node to provide the specific service to the network.

2. The apparatus of claim 1 wherein the generic service node communicates with a configuration server to receive the software to enable the generic service node to provide the specific service.

3. The apparatus of claim 1 further comprising:
   a control node, coupled to the network, for instructing the generic service node to provide the specific service.

4. The apparatus of claim 1, wherein the bootstrap software enables the generic service node to complete an SIA registration process in which the generic service node registers with an SIA service broker.

5. The apparatus of claim 3 wherein the control node comprises a service directory that defines the specific service.

6. The apparatus of claim 3 wherein the control node comprises a service directory that defines the specific service on a conditional basis, where the generic service node receives the software for providing the specific service upon a condition occurring.

7. The apparatus of claim 3 wherein the specific service is defined in a service policy.

8. The apparatus of claim 3 where the control node further comprises a service broker for instructing the generic service node to provide the specific service.

9. The apparatus of claim 3 wherein at least one of the control node or the generic service node are servers within a virtualized environment.

10. A method of providing a service to a network having a service insertion architecture (SIA) comprising:
    initially executing, at a generic service node, previously loaded bootstrap software;
    as a result of the execution of the bootstrap software, automatically registering with a control plane of the SIA such that the generic service node is configured to participate within the SIA without an initially assigned service;
    as a result of the execution of bootstrap software, operating in a first state in which the generic service node waits for instructions to adopt a specific service; and
    upon receiving instructions to adopt a specific service, operating in a second state where the generic service node installs software to enable the generic service node to provide the specific service to the network.

11. The method of claim 10 wherein registering with a control plane of the SIA comprises registering the generic service node with a control node, and wherein the method further comprises:
    receiving, at the generic service node, instructions from the control node causing the generic service node to operate in the second state and perform the specific service.

12. The method of claim 11 further comprising:
    requesting a configuration server to send the software to the generic service node
    sending software to the generic service node from the configuration server;
    executing the software at the generic service node to enable the specific service to be supplied to the network.

13. The method of claim 10 further comprising:
defining the specific service by a service policy.

14. The method of claim 10 further comprising:
dynamically selecting the specific service to support a need of the network.

15. A system comprising:
a generic service node coupled to a network having a service insertion architecture (SIA) and comprising previously loaded bootstrap software, wherein upon initialization the generic service node is configured to execute the bootstrap software so as to automatically register with a control plane of the SIA such that the generic service node is configured to participate within the SIA without an initially assigned service, wherein the bootstrap software causes the generic service node to operate in a first state in which the generic service node waits for instructions to adopt a specific service and, upon receiving instructions to adopt a specific service, the generic service node is configured to operate in a second state to install software to enable the generic service node to provide the specific service to the network; and
a control node, coupled to the network, for communicating the instructions to the generic service node to cause a transition from the first state to the second state.

16. The apparatus of claim 15 wherein the control node comprises a configuration server and wherein the generic service node is configured to communicate with the configuration server to receive the software to enable the generic service node to provide the specific service.

17. The apparatus of claim 15 wherein the control node comprises a service directory that defines the specific service.

18. The apparatus of claim 15 wherein the control node comprises a service directory that defines the specific service on a conditional basis, and wherein the generic service node is configured to transition from the first state to the second state upon a predetermined condition occurring.

19. The apparatus of claim 15 wherein the specific service is defined in a service policy.

20. The apparatus of claim 15 wherein the control node further comprises a service broker configured to instruct the generic service node to provide the specific service and insert the specific service into a new or existing service chain.

21. The apparatus of claim 15 wherein at least one of the control node, the generic service node or portions thereof are servers within a virtualized environment.

* * * * *